(12) United States Patent
Lee et al.

(10) Patent No.: US 10,068,347 B2
(45) Date of Patent: Sep. 4, 2018

(54) METHOD AND APPARATUS FOR ESTIMATING DEPTH, AND METHOD AND APPARATUS FOR TRAINING DISTANCE ESTIMATOR

(71) Applicant: Samsung Electronics Co., Ltd., Suwon-si, Gyeonggi-do (KR)

(72) Inventors: Wonhee Lee, Hwaseong-si (KR); Young Hun Sung, Hwaseong-si (KR); Soochul Lim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 43 days.

(21) Appl. No.: 15/384,616

(22) Filed: Dec. 20, 2016

(65) Prior Publication Data

US 2017/0200284 A1 Jul. 13, 2017

(30) Foreign Application Priority Data

Jan. 7, 2016 (KR) .................. 10-2016-0001993

(51) Int. Cl.
*G06T 7/593* (2017.01)
*H04N 13/00* (2018.01)
*H04N 13/02* (2006.01)

(52) U.S. Cl.
CPC ............ *G06T 7/593* (2017.01); *H04N 13/004* (2013.01); *H04N 13/0022* (2013.01);
(Continued)

(58) Field of Classification Search
CPC .. G06F 3/013; G06K 9/00604; G06K 9/0061; G06K 9/00912; G06K 9/52; G06T 7/60;
(Continued)

(56) References Cited

U.S. PATENT DOCUMENTS

| | | | |
|---|---|---|---|
| 6,690,451 B1 * | 2/2004 | Schubert | G01C 11/06 356/3.14 |
| 2008/0137989 A1 * | 6/2008 | Ng | G06K 9/20 382/285 |

(Continued)

FOREIGN PATENT DOCUMENTS

| | | |
|---|---|---|
| JP | 2010-128949 A | 6/2010 |
| JP | 2012-083330 A | 4/2012 |
| KR | 2009-0072523 A | 7/2009 |

OTHER PUBLICATIONS

Liu et al. ("Deep convolutional neural fields for depth estimation from a single image," IEEE Conference on Computer Vision and Pattern Recognition (CVPR), Jun. 7-12, 2015) (Year: 2015).*

(Continued)

*Primary Examiner* — Yubin Hung
(74) *Attorney, Agent, or Firm* — Harness, Dickey & Pierce, P.L.C.

(57) ABSTRACT

A method and apparatus for estimating a depth, and a method and apparatus for training an distance estimator are provided, wherein the method for estimating a depth may include obtaining an image, and estimating a depth of a second image object based on a correlation between a first image object and the second image object in the image and a depth of the first image object.

20 Claims, 5 Drawing Sheets

(52) U.S. Cl.
CPC ............... *H04N 13/0203* (2013.01); *G06T 2207/10028* (2013.01); *G06T 2207/20081* (2013.01); *H04N 13/0239* (2013.01); *H04N 2013/0081* (2013.01)

(58) Field of Classification Search
CPC ........... G06T 2207/10004; G06T 2207/30201; H04N 13/0203
See application file for complete search history.

(56) References Cited

U.S. PATENT DOCUMENTS

| | | | |
|---|---|---|---|
| 2012/0127275 A1 | 5/2012 | Von Zitzewitz et al. | |
| 2014/0028802 A1* | 1/2014 | Hendrickson | H04N 13/0239 348/47 |
| 2014/0063199 A1 | 3/2014 | Kim | |
| 2014/0104391 A1* | 4/2014 | Kim | H04N 13/0003 348/46 |
| 2014/0225990 A1 | 8/2014 | Einecke et al. | |
| 2014/0293016 A1* | 10/2014 | Benhimane | G06T 17/00 348/50 |
| 2015/0215606 A1 | 7/2015 | Sasada et al. | |
| 2015/0334309 A1* | 11/2015 | Peng | H04N 5/23229 348/47 |

OTHER PUBLICATIONS

Hsu et al. ("Three-Dimensional Location Measurement System Constructed by Dual Cameras," 2012 International Symposium on Computer, Consumer and Control (IS3C), Jun. 4-6, 2012) (Year: 2012).*

Muhammad et al. ("Learning shape from focus using multilayer neural networks," Proc. SPIE.3811, Vision Geometry VIII, Dec. 23, 1999) (Year: 1999).*

* cited by examiner

METHOD AND APPARATUS FOR ESTIMATING DEPTH, AND METHOD AND APPARATUS FOR TRAINING DISTANCE ESTIMATOR

CROSS-REFERENCE TO RELATED APPLICATION

This application claims the priority benefit under 35 U.S.C. § 119 of Korean Patent Application No. 10-2016-0001993, filed on Jan. 7, 2016, at the Korean Intellectual Property Office, the entire contents of which are incorporated herein by reference.

BACKGROUND

1. Field

At least one example embodiment relates to a method and apparatus for estimating a depth, and a method and apparatus for training a distance estimator.

2. Description of the Related Art

To measure a depth in a stereo camera, a disparity of a corresponding point may be found using a stereo matching algorithm that searches for a corresponding point of an image input by a left/right camera, and a depth may be calculated based on the disparity value, a focal length, and a baseline of the stereo camera.

In the stereo camera, a depth range measurable through stereo matching may be proportional to the baseline. It is necessary to increase a length of the baseline to measure a depth of an object positioned a long distance away and thus, it may be necessary to increase a size of a product. Stereo matching may be performed based on a sub-pixel unit instead of a pixel unit to measure the depth of the object positioned a long distance away without increasing the length of the baseline. However, a number of calculations may increase and despite this accuracy may be reduced.

SUMMARY

At least one example embodiment relates to a method of estimating a depth.

According to an example embodiment, the method may include obtaining an image, and estimating a depth of a second image object based on a correlation between a first image object and the second image object in the image and a depth of the first image object.

Example embodiments provide that the estimating may include estimating the depth of the second image object by inputting the value of the correlation between the first image object and the second image object in the image and the depth of the first image object into a pre-trained distance estimator. The first image object may be a short-distance image object positioned closer than a threshold depth determined based on a baseline of a stereo camera configured to obtain the image, and the second image object may be a long-distance image object positioned farther than the threshold depth.

Example embodiments provide that the estimating may include obtaining the depth of the first image object by performing stereo matching on the image.

Example embodiments provide that the estimating may include obtaining a value of the correlation by analyzing the image.

Example embodiments provide that the correlation may be obtained based on a depth cue of each of the first image object and the second image object.

Example embodiments provide that the depth cue may include at least one of a linear perspective, an aerial perspective, a relative size, a familiar size, a proximity to a horizon, and a texture gradient.

Example embodiments provide that each of the first image object and the second image object may include at least one of a corner point, a texture, and a line.

Example embodiments provide that the pre-trained distance estimator may be trained based on a depth of a long-distance object estimated based on a value of a correlation between an image of a short-distance object and an image of the long-distance object included in training data and a depth of the short-distance object obtained by performing stereo matching on the training data, and an actual depth of the long-distance object.

At least one example embodiment relates to a method of training a distance estimator.

According to an example embodiment, the method may include obtaining a correlation between a short-distance object and a long-distance object included in training data, obtaining a depth of the short-distance object by performing stereo matching on the training data, and training a distance estimator configured to estimate a depth of the long-distance object based on the correlation and the depth of the short-distance object.

Example embodiments provide that the short-distance object may be an object positioned closer than a threshold depth determined based on a baseline of a stereo camera configured to obtain the training data, and the long-distance object is an object positioned farther than the threshold value.

Example embodiments provide that the correlation may be obtained based on a depth cue of each of the short-distance object and the long-distance object.

Example embodiments provide that the depth cue may include at least one of a linear perspective, an aerial perspective, a relative size, a familiar size, a proximity to a horizon, and a texture gradient.

At least one example embodiment relates to an apparatus for estimating a distance.

According to an example embodiment, the apparatus may include a stereo camera configured to obtain an image, and a controller configured to estimate a depth of a second image object based on a value of a correlation between a first image object and the second image object and a depth of the first image object.

Example embodiments provide that the controller may be configured to estimate the depth of the second image object by inputting a value of the correlation between the first image object and the second image object and the depth of the first image object into a pre-trained distance estimator. The first image object may be a short-distance image object positioned closer than a threshold depth determined based on a baseline of the stereo camera, and the second image object is a long-distance image object positioned farther than the threshold depth.

Example embodiments provide that the pre-trained distance estimator may be trained based on a depth of a long-distance object estimated based on a value of a correlation between an image of a short-distance object and an image of the long-distance object included in training data and a depth of the short-distance object obtained by performing stereo matching on the training data, and an actual depth of the long-distance object.

Example embodiments provide that the controller may be configured to obtain the depth of the first image object by performing stereo matching on the image.

Example embodiments provide that the controller may be configured to obtain a value of the correlation by analyzing the image.

Example embodiments provide that the controller may be configured to obtain the value of the correlation based on a depth cue of each of the first image object and the second image object.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
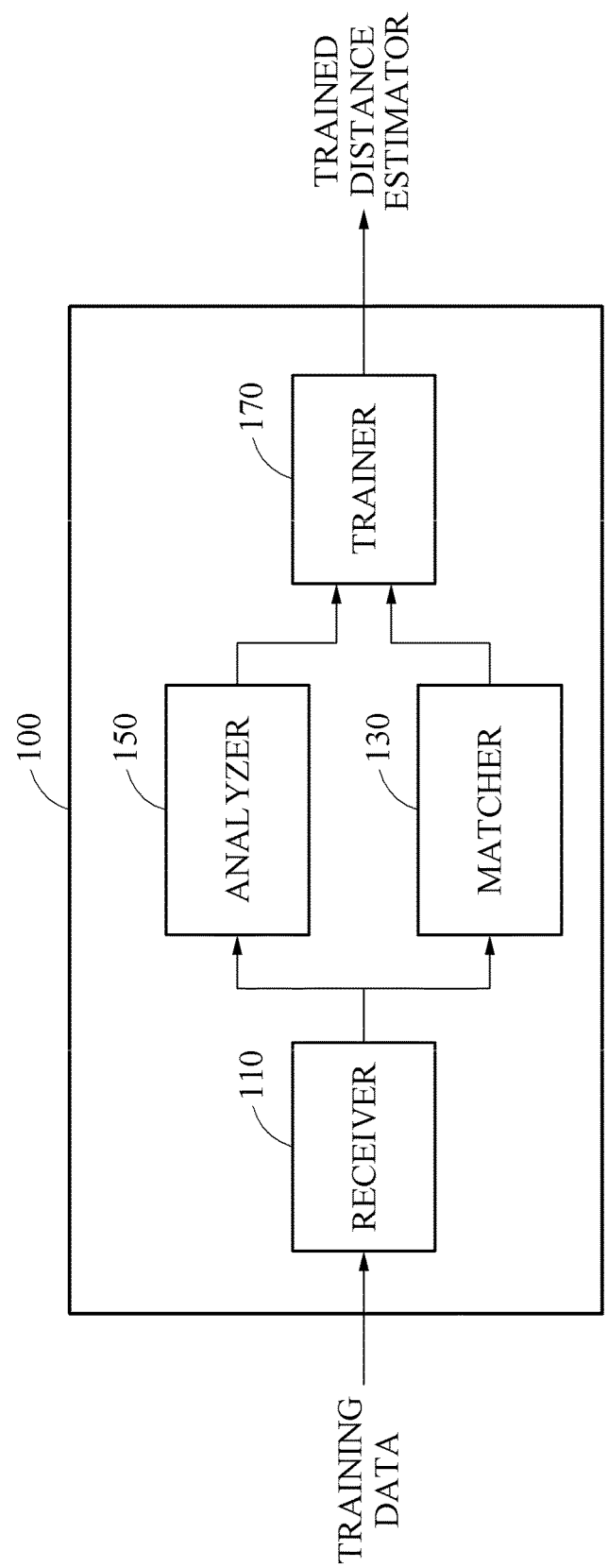
FIG. 1 is a block diagram illustrating an example of a training apparatus according to at least one example embodiment.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a block diagram illustrating an example of a training apparatus according to at least one example embodiment.

In FIG. 1, a training apparatus 100 includes a receiver 110, a matcher 130, an analyzer 150, and/or a trainer 170.

The training apparatus 100 trains a distance estimator to estimate a depth of an image object or an object at a long distance. For example, the training apparatus 100 may receive training data including the image object and train the distance estimator to estimate a depth of the image object based on the received training data.

The training apparatus 100 may be included or embodied in a personal computer (PC), a data server, or a portable electronic device.

The portable electronic device may be provided in a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a handheld console, an e-book, or a smart device. For example, the smart device may be provided in a smart watch or a smart band.

The receiver 110 receives the training data. The training data may be an image obtained from a stereo camera. The training data may include a short-distance image object and a long-distance image object. Each of the short-distance image object and the long-distance image object may include at least one of a corner point, a texture, and a line.

The short-distance image object may be an image object positioned a short distance from the stereo camera, and the long-distance image object may be an image object positioned a long distance from the stereo camera. For example, the short-distance image object may be an image object positioned closer than a threshold depth determined based on the baseline of the stereo camera, and the long-distance image object may be an image object positioned farther than the threshold depth.

The training data may include a left image and a right image. The left image may be obtained from a first stereo camera included in the stereo camera, and the right image may be obtained from a second stereo camera included in the stereo camera. The left image and the right image may include the short-distance image object and the long-distance image object.

The analyzer 150 obtains a correlation between the short-distance image object and the long-distance image object in the training data by analyzing the training data. For example, the analyzer 150 may obtain a value of a correlation between a depth cue of each of the short-distance image object and the long-distance image object. The depth cue includes at least one of a linear perspective, an aerial perspective, a relative size, a familiar size, a proximity to a horizon, and a texture gradient. Hereinafter, a correlation may be also referred to as a value of a correlation.

The matcher 130 obtains a depth of the short-distance image object by performing stereo matching on the training data. For example, the matcher 130 detects a disparity between coordinates of the short-distance image object and the long-distance image object by performing the stereo matching on the left image and the right image. The matcher 130 calculates a depth of the short-distance image object using the value of the disparity between the coordinates of the short-distance image object. It may be difficult to calculate a depth of the long-distance image object using the value of the disparity between the coordinates of the long-distance image object, since the value of the disparity between the coordinates of the long-distance image object is close to "0".

The short-distance image object is referred to as an image object of which the depth is obtainable by the stereo matching performed by the matcher 130, and the long-distance image object is referred to as an image object of which a depth is difficult to obtain by the stereo matching performed by the matcher 130.

The trainer 170 trains the distance estimator to estimate the depth of the long-distance image object based on the correlation between the short-distance image object and the long-distance image object and the depth of the short-distance image object. Detailed descriptions of a training method of the trainer 170 will be provided with reference to FIG. 2.

The receiver 110, the matcher 130, the analyzer 150, and the trainer 170 may be provided in a module. The module may be referred to as a hardware to perform a function of an operation of a constituent component, for example, the receiver 110, the matcher 130, the analyzer 150, and the trainer 170, or a computer program code to perform a predetermined or desired function and a predetermined or desired operation, or an electronic recording medium, for example, a processor and a microprocessor, in which a computer program code to perform a predetermined or desired function and a predetermined or desired operation is embodied. Thus, the module may be a functional and/or structural combination of a hardware to perform operations of each constituent component, for example, the receiver 110, the matcher 130, the analyzer 150, and the trainer 170, and/or a software to drive the hardware.

Figure 2:
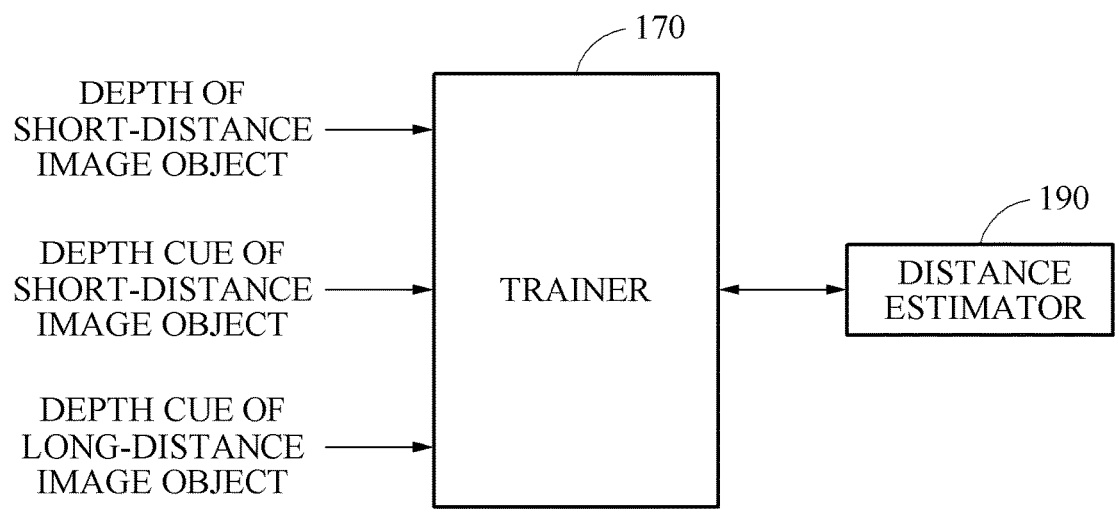
FIG. 2 illustrates an example of training for estimating a distance according to at least one example embodiment.

FIG. 2 illustrates an example of training for estimating a distance according to at least one example embodiment.

Referring to FIG. 2, the trainer 170 may apply a correlation between a short-distance image object and a long-distance image object and a depth of the short-distance image object to a distance estimator 190. For example, the trainer 170 may input a value of the correlation into the distance estimator 190. For example, the trainer 170 may input a depth cue of the short-distance image object, a depth cue of the long-distance image object, and the depth of the long-distance image object into the distance estimator 190.

The distance estimator 190 may generate output values corresponding to the depth of the long-distance image object based on input values. The distance estimator 190 may include an artificial neural network.

The artificial neural network may include an input layer, a hidden layer, and an output layer. Each layer may include a plurality of nodes, and nodes between neighboring layers having connection weights may be connected to each other. Each node may operate based on an activation model. An output value corresponding to an input value may be determined based on the activation model. An output value of a predetermined or desired node may be input into a node of a next layer connected to the predetermined or desired node. The node of the next layer may receive values output from the plurality of nodes. In a process in which the output value of the predetermined or desired node is input into the node of the next layer, a connection weight may be applied. The node of the next layer may output the output value corresponding to the input value into a node of a layer subsequently connected to the node of the next layer based on the activation model.

The output layer may include nodes corresponding to a depth of the long-distance image object. The nodes of the output layer may output feature values corresponding to the depth of the long-distance image object.

The distance estimator 190 may estimate the depth of the long-distance image object based on the feature values output from the artificial neural network. Since the trainer 170 is aware of an actual depth of the long-distance image object, the trainer 170 may calculate a difference between the actual depth and the depth of the long-distance image object estimated by the distance estimator 190.

The trainer 170 may update the distance estimator 190 using a back propagation method in order to decrease the difference. For example, the trainer 170 may propagate the difference in a reverse direction from the output layer to the input layer via hidden layer in the artificial neural network. In a process in which the difference is propagated in the reverse direction, the connection weights between the nodes may be updated in order to decrease the difference. Thus, the trainer 170 may train the distance estimator 190 based on the difference. The aforementioned training operation may be iteratively performed until the difference is less than a predetermined or desired threshold value.

The trainer 170 may train the distance estimator 190 to reduce or minimize the difference between the actual depth and the depth of the long-distance image object estimated by the distance estimator 190.

Figure 3:
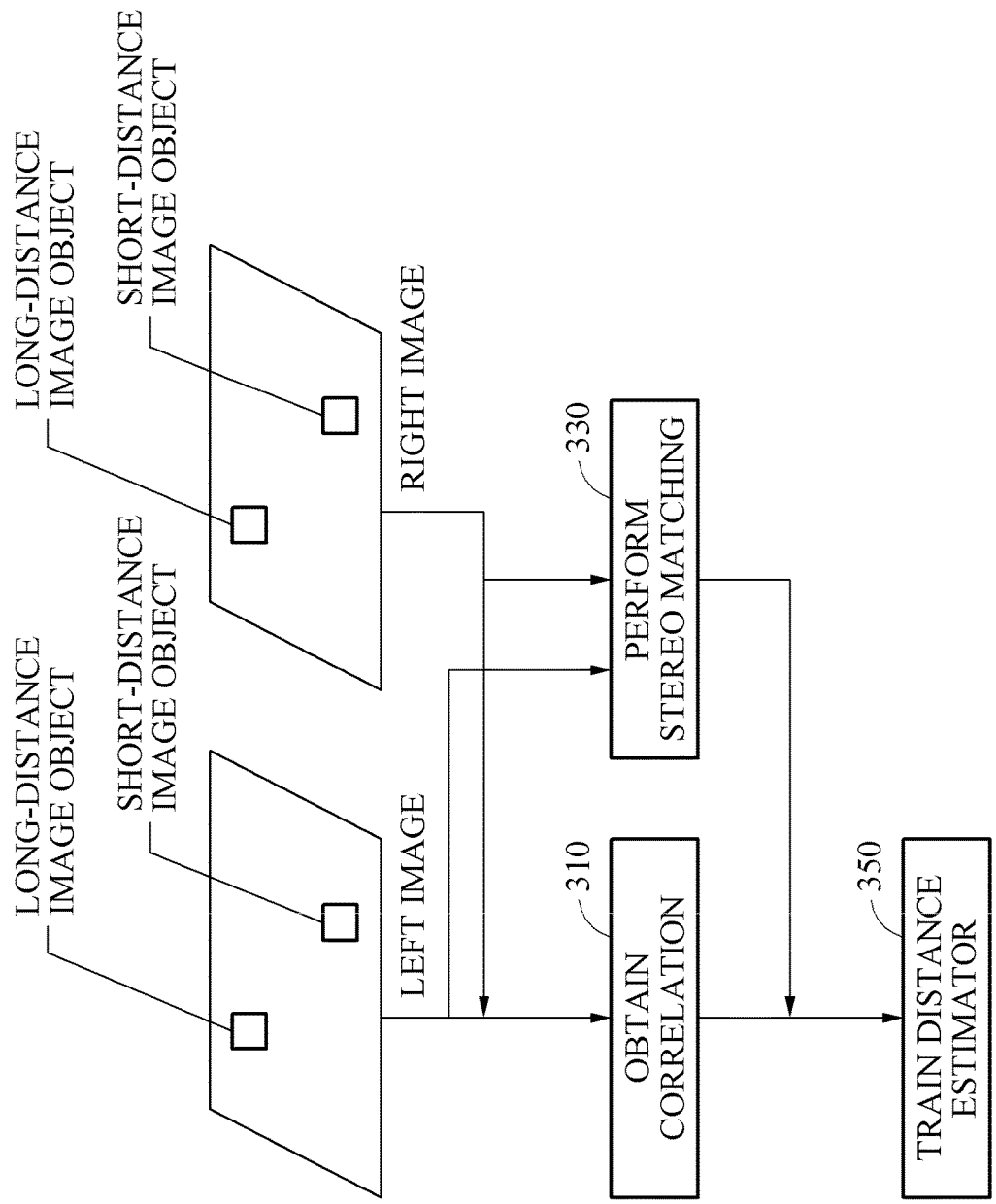
FIG. 3 is a flowchart illustrating an example of a training operation of a training apparatus according to at least one example embodiment.

FIG. 3 is a flowchart illustrating an example of a training operation of a training apparatus according to at least one example embodiment.

Referring to FIGS. 1 through 3, the receiver 110 may receive training data. The training data may include a left image and a right image obtained from a stereo camera. The left image and the right image may include a short-distance image object and a long-distance image object.

The receiver 110 may transmit the left image and the right image to the analyzer 150 and the matcher 130.

In operation 310, the analyzer 150 obtains a correlation, for example, a value of a correlation, between the short-distance image object and the long-distance image object by analyzing the left image and the right image. For example, the analyzer 150 may obtain a depth cue of each of the short-distance image object and the long-distance image object.

In operation 330, the matcher 130 performs stereo matching on the left image and the right image. The matcher 130 may obtain a depth of the short-distance image object from the stereo matching. For example, the matcher 130 may detect a disparity between coordinates of the short-distance image object by performing the stereo matching on the left image and the right image, and calculate the depth of the short-distance image object based on the detected disparity value.

In operation 350, the trainer 170 trains the distance estimator 190 to estimate a depth of the long-distance image object based on the value of the correlation between the short-distance image object and the long-distance image object and the depth of the short-distance image object. For example, the trainer 170 may train the distance estimator 190 to reduce or minimize a difference between an actual depth of the long-distance image object and the depth of the long-distance object estimated by the distance estimator 190.

Figure 4:
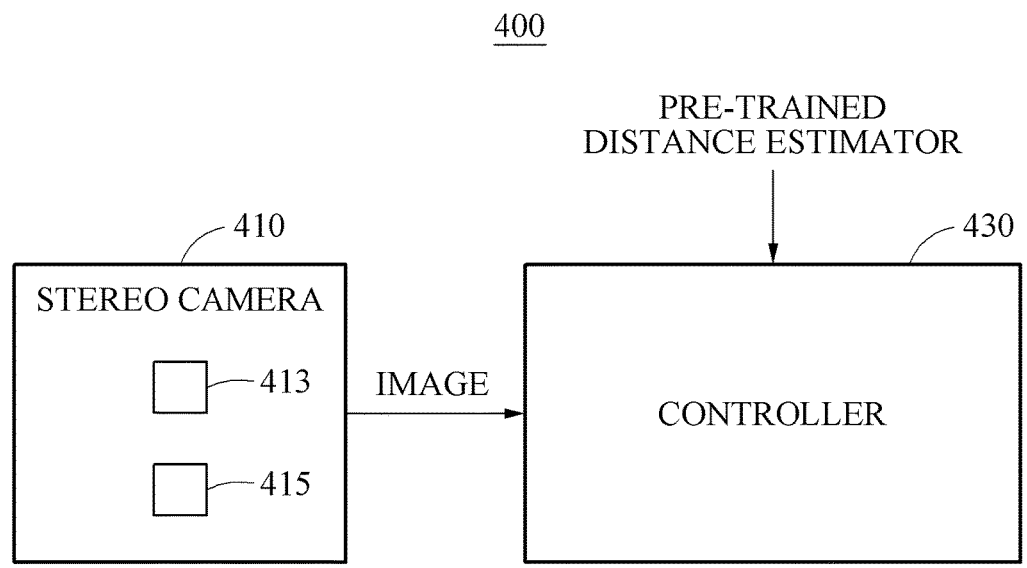
FIG. 4 is a block diagram illustrating an example of an apparatus for estimating a distance according to at least one example embodiment.
Figure 5:
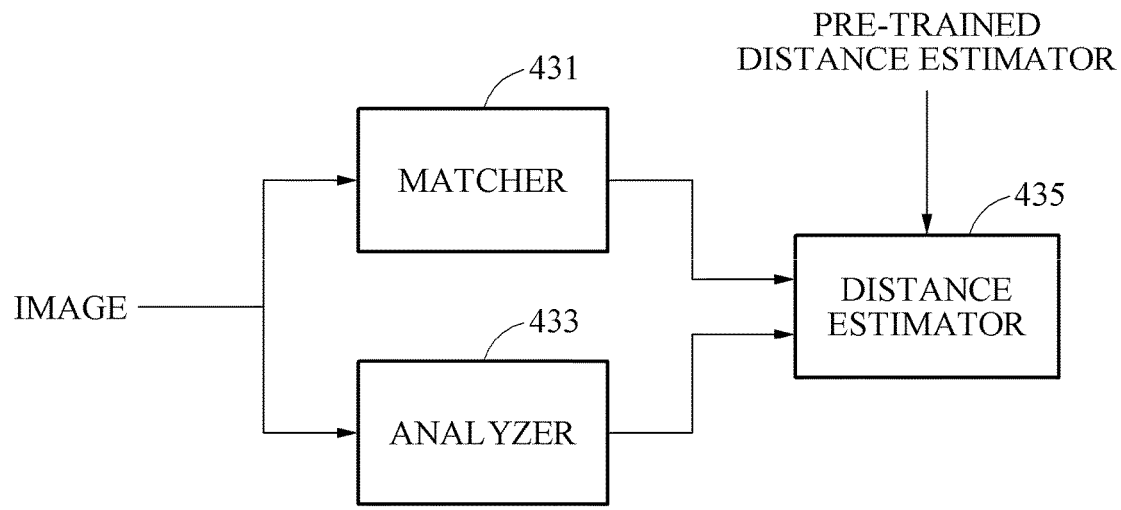
FIG. 5 is a block diagram illustrating an example of a controller illustrated in FIG. 4 according to at least one example embodiment.

FIG. 4 is a block diagram illustrating an example of an apparatus for estimating a distance, and FIG. 5 is a block diagram illustrating an example of a controller illustrated in FIG. 4 according to at least one example embodiment.

Referring to FIGS. 4 and 5, an apparatus for estimating a distance, hereinafter also referred to as a distance estimating apparatus 400, includes a stereo camera 410 and a controller 430.

The distance estimating apparatus 400 may be an apparatus for estimating a depth. In an example, the distance estimating apparatus 400 may receive an image from the stereo camera 410, and estimate a depth of a long-distance image object based on a depth of a short-distance image object in the image. In another example, the distance estimating apparatus 400 may receive the image from the stereo camera 410, and estimate the depth of the long-distance image object in the image using a pre-trained distance estimator. In summary, the distance estimating apparatus 400 may more accurately estimate the depth of the long-distance image object in the image using the pre-trained distance estimator.

The distance estimating apparatus 400 may be included in a personal computer (PC), a data server, or a portable electronic device.

The portable electronic device may be provided in a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a handheld console, an e-book, or a smart device. For example, the smart device may be provided in a smart watch or a smart band.

The distance estimating apparatus 400 may be provided in an autonomous driving system, an advanced driver assistant system (ADAS), a robot, or a drone.

The stereo camera 410 may obtain the image. The stereo camera 410 may include a first stereo camera 413 and a second stereo camera 415. The first stereo camera 413 may obtain a left image. The second stereo camera 415 may obtain a right image. The image may include the left image and the right image.

Each of the left image and the right image included in the image may include a short-distance image object and a long-distance image object. The short-distance image object and the long-distance image object may include at least one of a corner point, a texture, and a line.

The short-distance image object may be an image object positioned a short distance from the stereo camera 410, and the long-distance image object may be an image object positioned a long distance from the stereo camera 410. For example, the short-distance image object may be an image object positioned closer than a threshold depth determined based on a baseline between the first stereo camera 413 and the second stereo camera 415, and the long-distance image object may be an image object positioned farther than the threshold depth.

The controller 430 may overall control operation of the distance estimating apparatus 4001. The controller 430 may be provided in a printed circuit board (PCB), for example, a motherboard, an integrated circuit (IC), or a system on chip (SoC). For example, the controller 430 may be an application processor.

The controller 430 may estimate a depth of an object in the image using a pre-trained distance estimator. The pre-trained distance estimator may be a distance estimator trained by the training apparatus 100 of FIG. 1.

The controller 430 may include a matcher 431, an analyzer 433, and a distance estimator 435.

The analyzer 433 may analyze the image and obtain a value of a correlation between the short-distance image object and the long-distance image object in the image. For example, the analyzer 433 may extract a depth cue of each of the short-distance image object and the long-distance image object. The depth cue may include at least one of a linear perspective, an aerial perspective, a relative size, a familiar size, a proximity to horizon, and a texture gradient.

The matcher 431 may obtain a depth of the short-distance image object by performing stereo matching on the image. For example, the matcher 431 may detect a disparity between coordinates of the short-distance image object by performing the stereo matching on the left image and the right image. The matcher 431 may calculate the depth of the short-distance image object based on the detected disparity value.

The distance estimator 435 may be the pre-trained distance estimator. The distance estimator 435 may estimate the depth of the long-distance image object based on the value of the correlation between the short-distance image object and the long-distance image object and the depth of the short-distance image object. Although FIG. 5 illustrates that the analyzer 433 is provided outside of the distance estimator 435, the analyzer 433 may be included in the distance estimator 435.

The matcher 431, the analyzer 433, and the distance estimator 435 may be provided in a module. The module may be referred to as a hardware to perform a function and an operation of a constituent component, for example, the matcher 431, the analyzer 433, and the distance estimator 435, or a computer program code to perform a predetermined or desired function and a predetermined or desired operation, or an electronic recording medium, for example, a processor and a microprocessor, in which a computer program code to perform a predetermined or desired function and a predetermined or desired operation is embodied. Thus, the module may be a functional and/or structural combination of a hardware to perform operations of each constituent component, for example, the matcher 431, the analyzer 433, and the distance estimator 435, and/or a software to drive the hardware.

Figure 6:
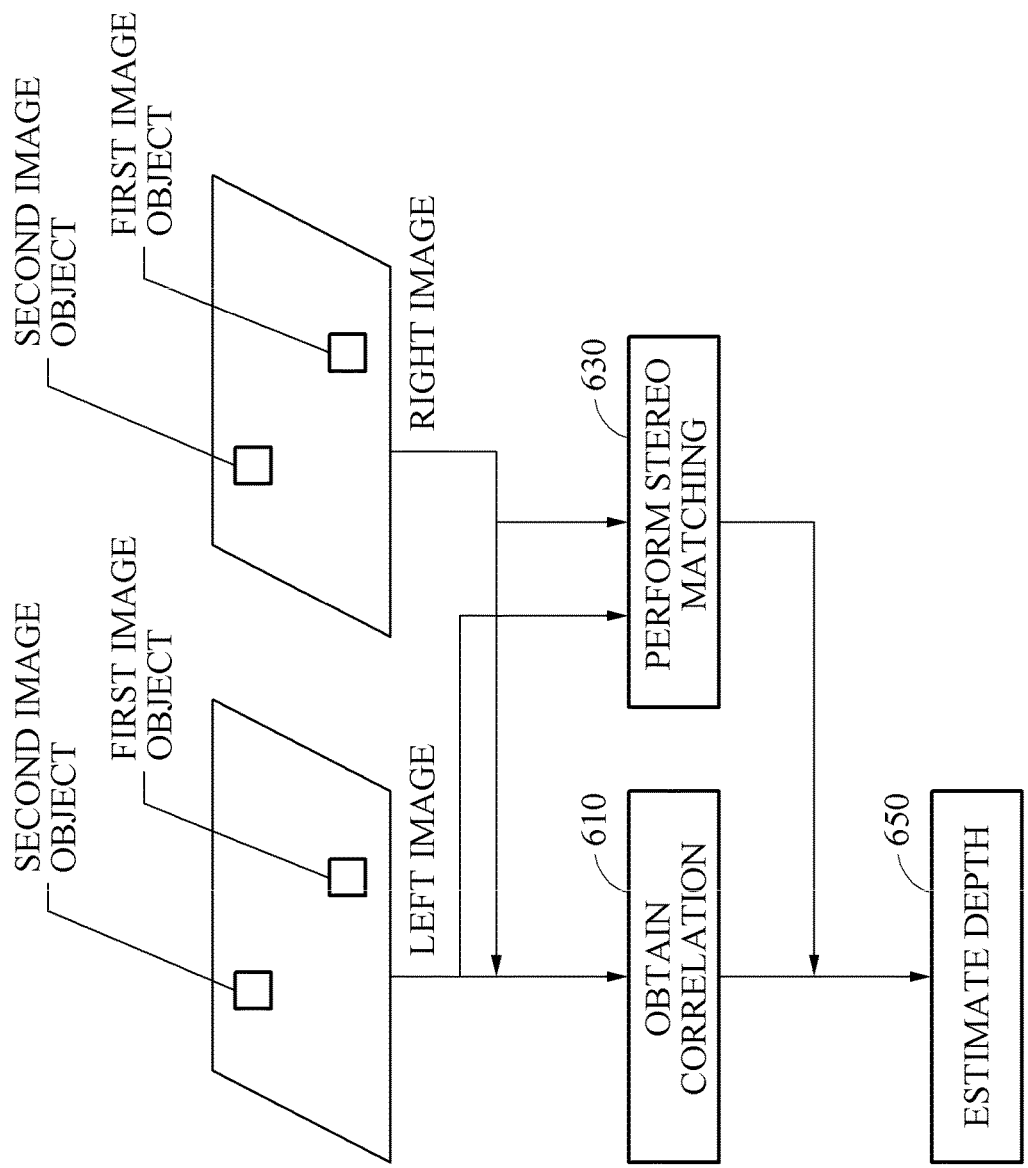
FIG. 6 is a flowchart illustrating an example of an operation of an apparatus for estimating a distance according to at least one example embodiment.

FIG. 6 is a flowchart illustrating an example of an operation of an apparatus for estimating a distance according to at least one example embodiment.

Referring to FIGS. 4 through 6, the stereo camera 410 may obtain an image. The image may include a left image and a right image. Each of the left image and the right image may include a short-distance image object and a long-distance image object.

The stereo camera 410 may transmit the left image and the right image to the matcher 431 and the analyzer 433.

In operation 610, the analyzer 433 obtains a value of a correlation between the short-distance image object and the long-distance image object by analyzing the left image and the right image. For example, the analyzer 433 may obtain a depth cue of each of the short-distance image object and the long-distance image object.

In operation 630, the matcher 431 performs stereo matching on the left image and the right image. The matcher 431 may obtain a depth of the short-distance image object from the stereo matching. For example, the matcher 431 may detect a disparity between coordinates of the short-distance image object by performing the stereo matching on the left image and the right image, and calculate the depth of the short-distance image object based on the detected disparity value.

In operation 650, the distance estimator 435 estimates a depth of the long-distance object based on the depth cue of each of the short-distance image object and the long-distance image object and the depth of the short-distance image object.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a depth, the method comprising:
    obtaining an image of a scene including at least a first object and a second object;
    estimating a depth of a second image object corresponding to the second object based on a correlation between a first image object corresponding to the first object and the second image object in the image and a depth of the first image object.

2. The method of claim 1, wherein the estimating comprises estimating the depth of the second image object by inputting the value of the correlation between the first image object and the second image object in the image and the depth of the first image object into a pre-trained distance estimator.

3. The method of claim 1, wherein the first image object is a short-distance image object positioned closer than a threshold depth determined based on a baseline of a stereo camera configured to obtain the image, and the second image object is a long-distance image object positioned farther than the threshold depth.

4. The method of claim 1, wherein the estimating comprises obtaining the depth of the first image object by performing stereo matching on the image.

5. The method of claim 1, wherein the estimating comprises obtaining a value of the correlation by analyzing the image.

6. The method of claim 1, wherein the correlation is obtained based on a depth cue of each of the first image object and the second image object.

7. The method of claim 6, wherein the depth cue comprises at least one of a linear perspective, an aerial perspective, a relative size, a familiar size, a proximity to a horizon, and a texture gradient.

8. The method of claim 1, wherein each of the first image object and the second image object comprises at least one of a corner point, a texture, and a line.

9. The method of claim 2, wherein the pre-trained distance estimator is trained based on an estimated depth of a training long-distance object in a scene and an actual depth of the training long-distance object;
    wherein the estimated depth of the training long-distance object is estimated based on (1) a value of a correlation between an image of a training short-distance object in the scene and an image of the training long-distance object included in training data and (2) a depth of the training short-distance object obtained by performing stereo matching on the training data.

10. A method of training a distance estimator, the method comprising:
    obtaining a correlation between each pair of training short-distance object and training long-distance object of a scene included in training data;

obtaining a depth of each training short-distance object by performing stereo matching on the training data;

obtaining actual depth of each training long-distance object; and training the distance estimator using the correlation between each pair of training short-distance object and training long-distance object, the depth of each training short-distance object and the actual depth of each training long-distance object;

wherein the distance estimator is configured to estimate a depth of a long-distance object in a scene based on a depth of a short-distance object in the scene and a correlation between the short-distance object and the long-distance object.

11. The method of claim 10, wherein the short-distance object is an object positioned closer than a threshold depth determined based on a baseline of a stereo camera configured to obtain the training data, and the long-distance object is an object positioned farther than the threshold value.

12. The method of claim 10, wherein the correlation is obtained based on a depth cue of each of the short-distance object and the long-distance object.

13. The method of claim 12, wherein the depth cue comprises at least one of a linear perspective, an aerial perspective, a relative size, a familiar size, a proximity to a horizon, and a texture gradient.

14. An apparatus for estimating a distance, the apparatus comprising:

a stereo camera configured to obtain an image of a scene including at least a first object and a second object; and a circuit configured to estimate a depth of a second image object corresponding to the second object based on a value of a correlation between a first image object corresponding to the first object and the second image object in the image and a depth of the first image object.

15. The apparatus of claim 14, wherein the circuit is configured to estimate the depth of the second image object by inputting the value of the correlation between the first image object and the second image object and the depth of the first image object into a pre-trained distance estimator.

16. The apparatus of claim 14, wherein the first image object is a short-distance image object positioned closer than a threshold depth determined based on a baseline of the stereo camera, and the second image object is a long-distance image object positioned farther than the threshold depth.

17. The apparatus of claim 15, wherein the pre-trained distance estimator is trained based on an estimated depth of a long-distance object in a scene and an actual depth of the long-distance object;

wherein the estimated depth of the long-distance object is estimated based on (1) a value of a correlation between an image of a short-distance object in the scene and an image of the long-distance object included in training data and (2) a depth of the short-distance object obtained by performing stereo matching on the training data.

18. The apparatus of claim 14, wherein the controller is configured to obtain the depth of the first image object by performing stereo matching on the image.

19. The apparatus of claim 14, wherein the controller is configured to obtain a value of the correlation by analyzing the image.

20. The apparatus of claim 19, wherein the controller is configured to obtain the value of the correlation based on a depth cue of each of the first image object and the second image object.

* * * * *